(12) United States Patent
Miyazawa

(10) Patent No.: US 9,167,044 B2
(45) Date of Patent: Oct. 20, 2015

(54) COMMUNICATION SYSTEM FOR RECEIVING AUTHENTICATION DATA FROM AN EXTERNAL SERVICE

(75) Inventor: Masafumi Miyazawa, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 477 days.

(21) Appl. No.: 13/427,499

(22) Filed: Mar. 22, 2012

(65) Prior Publication Data

US 2013/0060889 A1 Mar. 7, 2013

(30) Foreign Application Priority Data

Sep. 7, 2011 (JP) ................... 2011-194455

(51) Int. Cl.
*G06F 15/16* (2006.01)
*H04L 29/08* (2006.01)
*H04L 29/06* (2006.01)

(52) U.S. Cl.
CPC ................ *H04L 67/16* (2013.01); *H04L 63/08* (2013.01); *H04L 67/2814* (2013.01)

(58) Field of Classification Search
CPC ...... H04L 63/08; H04L 67/2814; H04L 67/16
USPC ............. 726/4; 358/1.15, 1.14; 709/217, 223, 709/220, 227
See application file for complete search history.

(56) References Cited

U.S. PATENT DOCUMENTS

| | | | | |
|---|---|---|---|---|
| 2003/0101236 A1* | 5/2003 | Ohara | ........................... | 709/218 |
| 2004/0160636 A1* | 8/2004 | Kondo et al. | ................ | 358/1.15 |
| 2006/0110171 A1* | 5/2006 | Miyazawa et al. | ................ | 399/8 |
| 2006/0119883 A1* | 6/2006 | Lovat et al. | ................... | 358/1.15 |
| 2006/0123092 A1 | 6/2006 | Madams et al. | | |
| 2006/0282528 A1 | 12/2006 | Madams et al. | | |
| 2007/0011261 A1 | 1/2007 | Madams et al. | | |
| 2008/0244716 A1 | 10/2008 | Goto | | |
| 2008/0313714 A1* | 12/2008 | Fetterman et al. | ................ | 726/4 |
| 2011/0026064 A1* | 2/2011 | Kato et al. | .................... | 358/1.14 |
| 2011/0035785 A1* | 2/2011 | Mihara | ............................. | 726/2 |
| 2011/0161823 A1* | 6/2011 | Miyata | .......................... | 715/733 |
| 2011/0222102 A1* | 9/2011 | Ito | ................................. | 358/1.14 |
| 2012/0117629 A1 | 5/2012 | Miyazawa et al. | | |

FOREIGN PATENT DOCUMENTS

JP 2005-269250 A 9/2005
JP 2008-252567 A 10/2008

* cited by examiner

*Primary Examiner* — Joon H Hwang
*Assistant Examiner* — Abdulkader M Alriyashi
(74) *Attorney, Agent, or Firm* — Merchant & Gould PC

(57) ABSTRACT

A communication system includes a communication device and a relay apparatus that are connected to a network with an external service. The communication device includes a communication unit connected to a browser-installed device and a controller configured to transmit data location information to the browser installed device and output location of the communication device. The relay apparatus includes a communication unit and a controller configured to receive a request, transmit predetermined data based on the request, get the communication-device location information, instruct the browser-installed device to output the communication-device location information, receive authentication data, get the communication-device location information or the correspondence information output by the browser-installed device, and instruct the browser-installed device to transmit the authentication data to the communication device.

18 Claims, 13 Drawing Sheets

EXAMPLE OF MFP IDENTIFIER TABLE 204c

| MFP IDENTIFIER | CALLBACK URL OF MFP |
|---|---|
| A A A | http://10.163.20.43/MFP123 |
| B B B | http://10.163.30.53/MFP567 |
| C C C | http://10.163.40.63/MFP890 |
| ⋮ | |

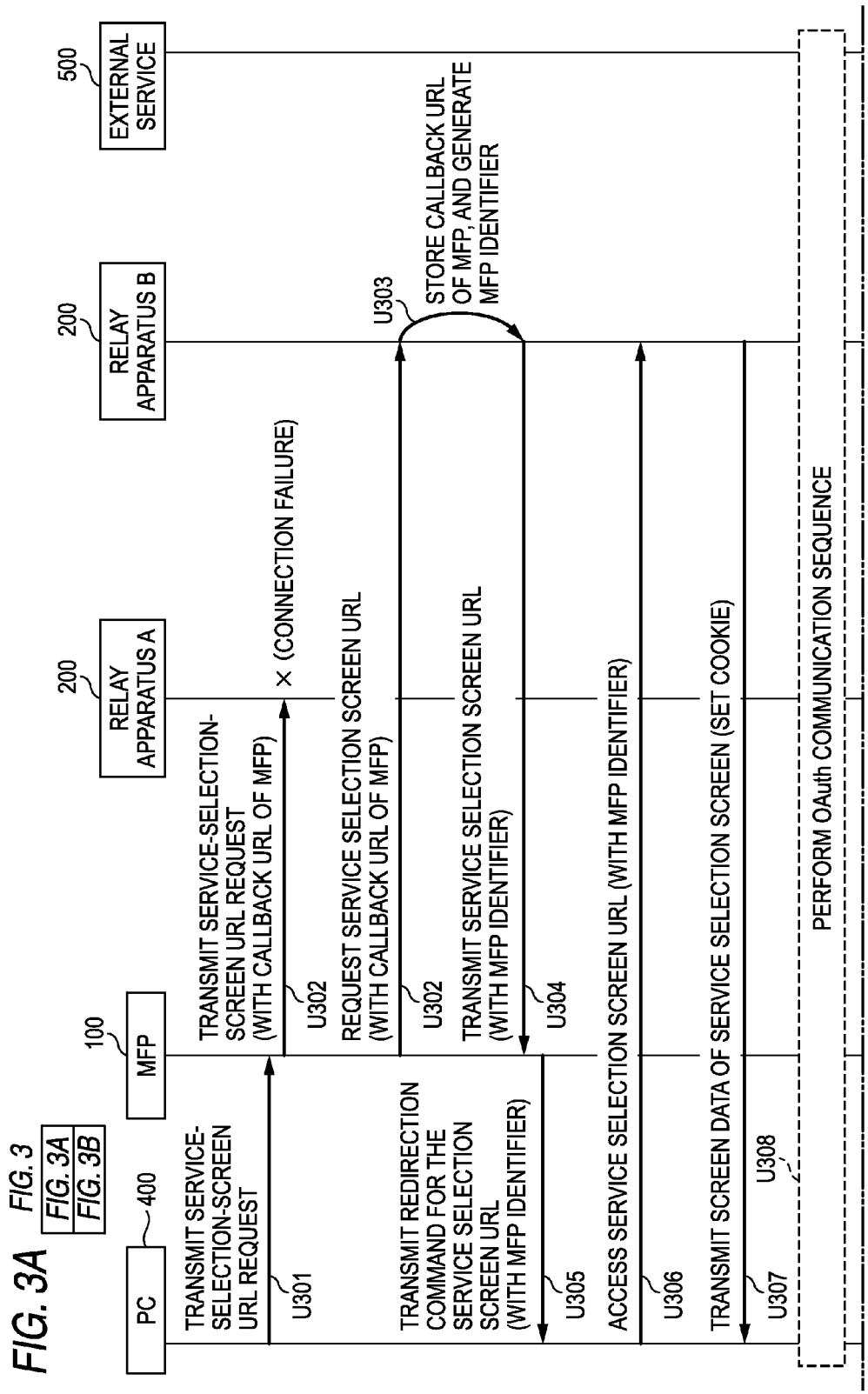

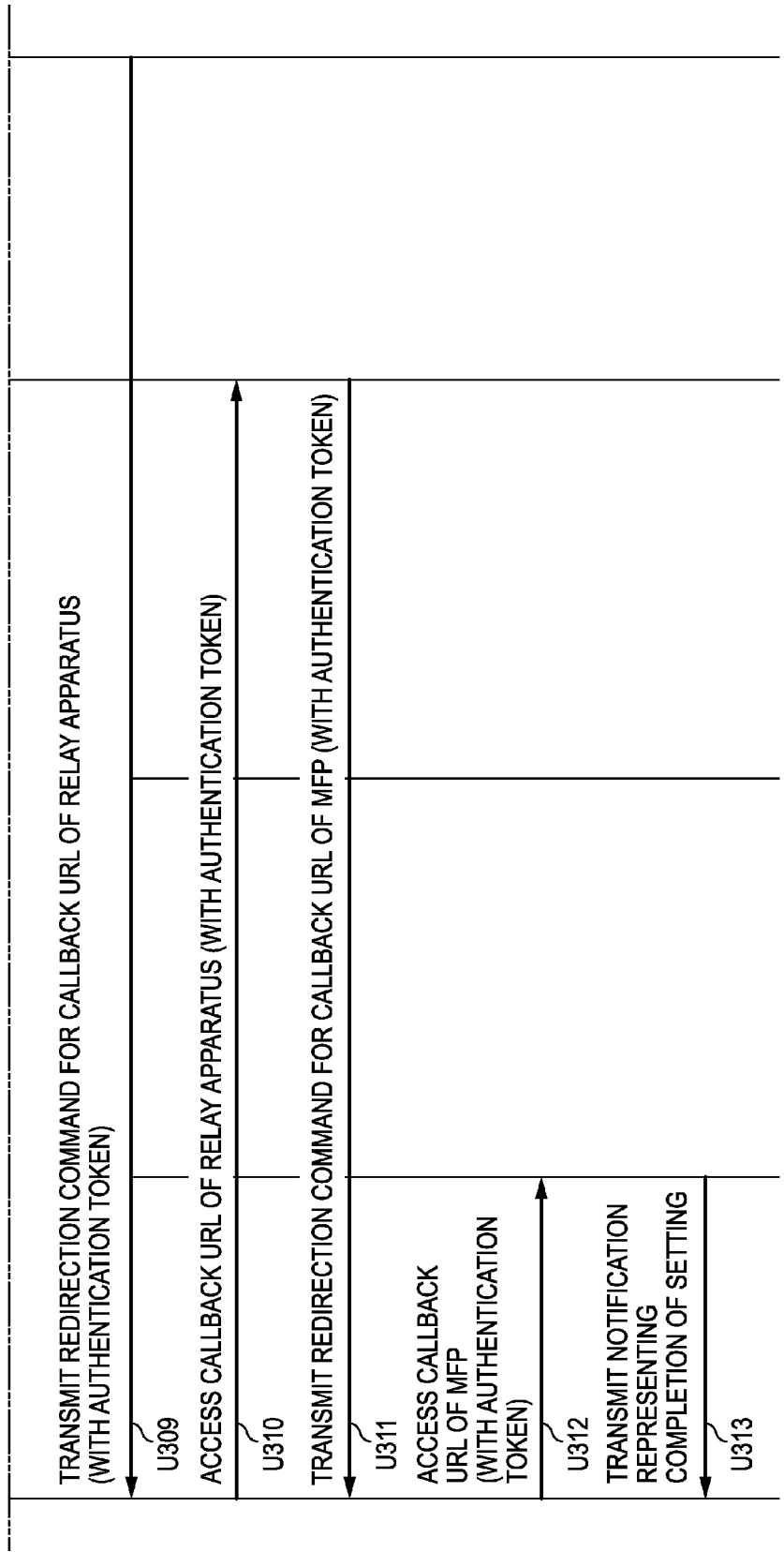

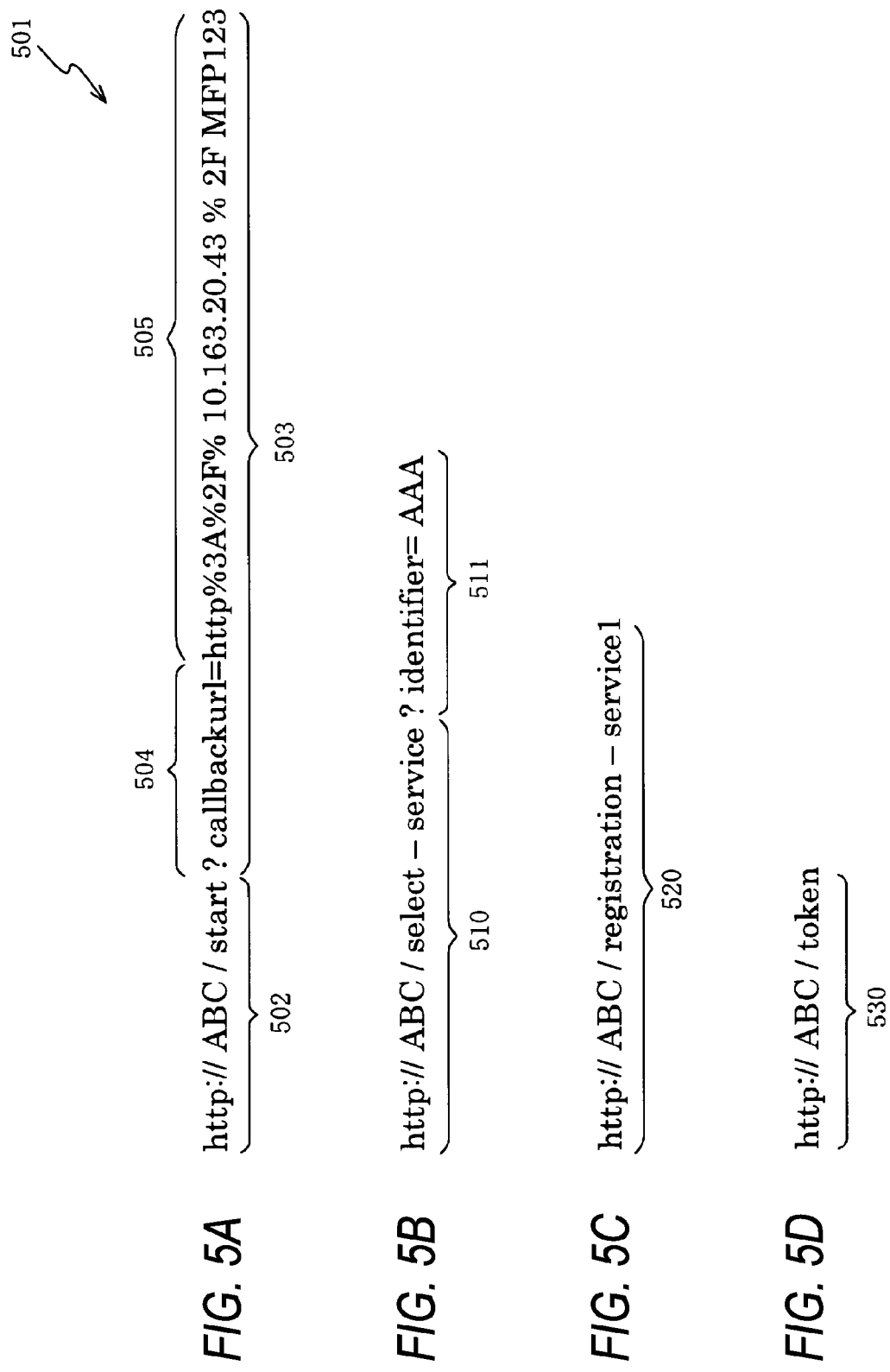

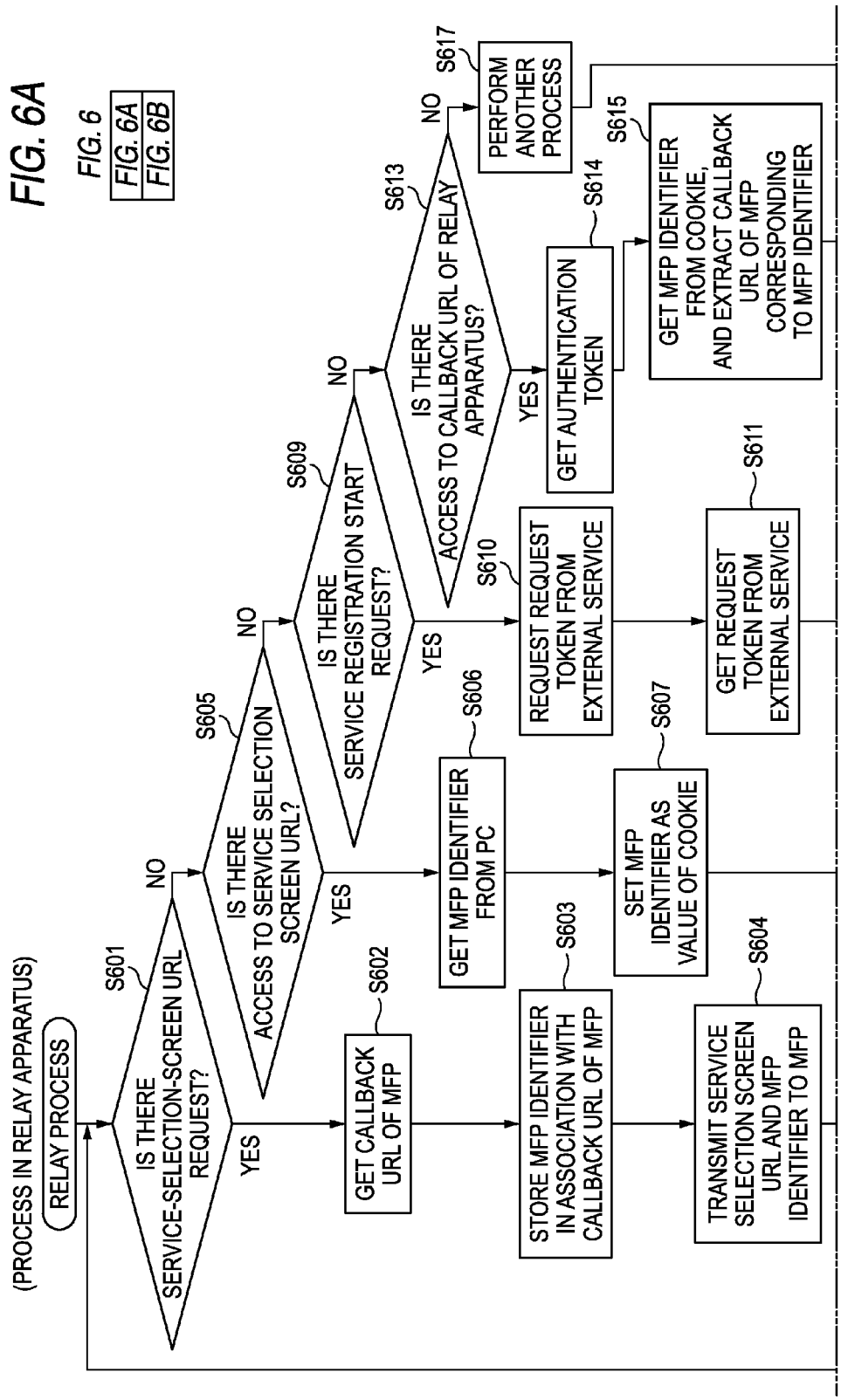

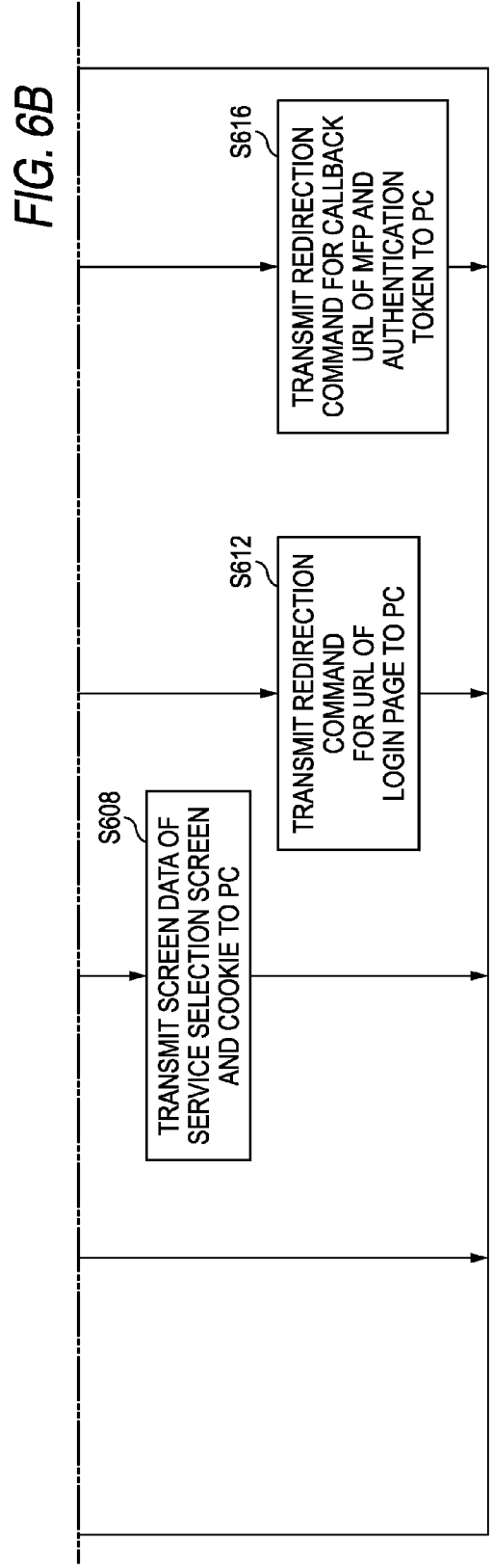

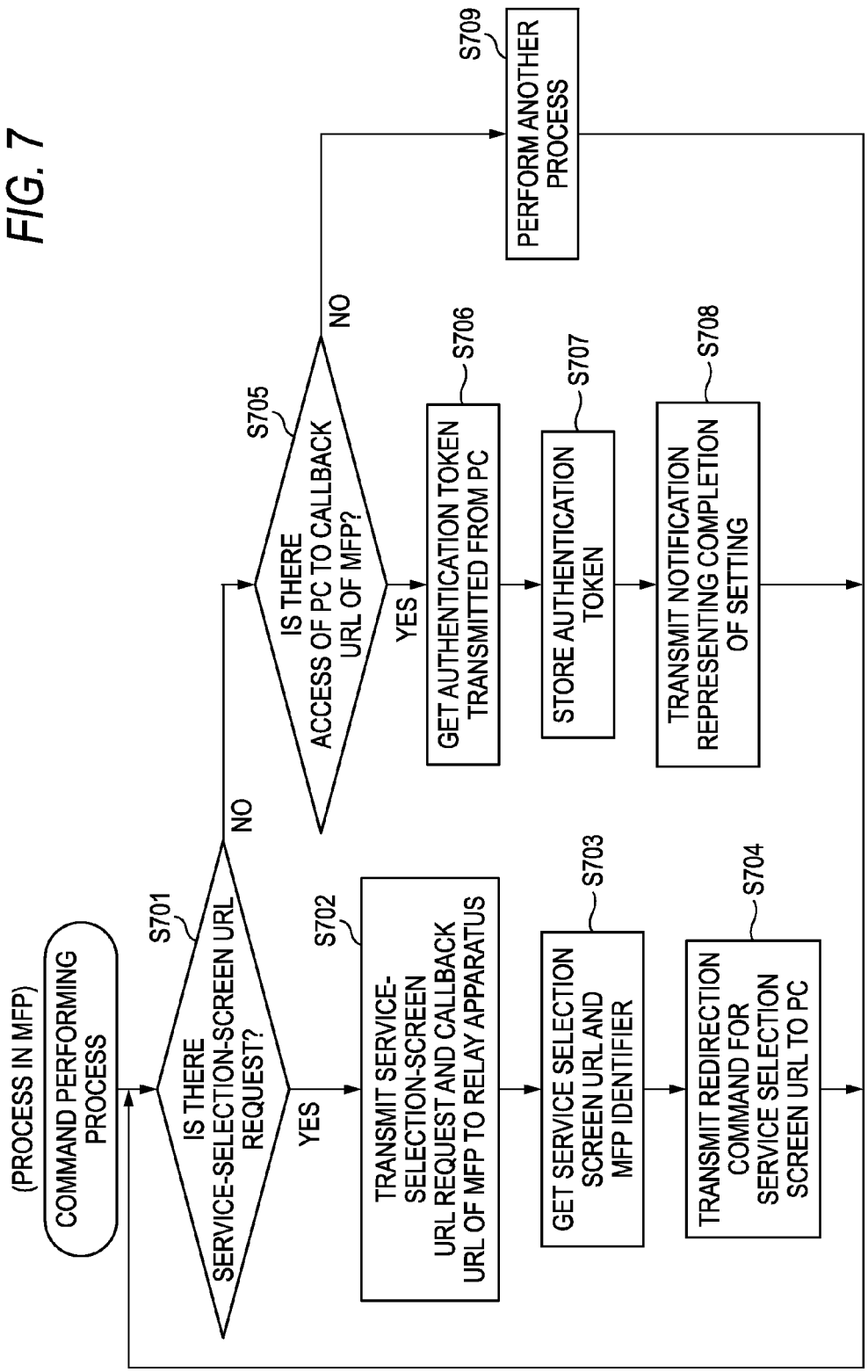

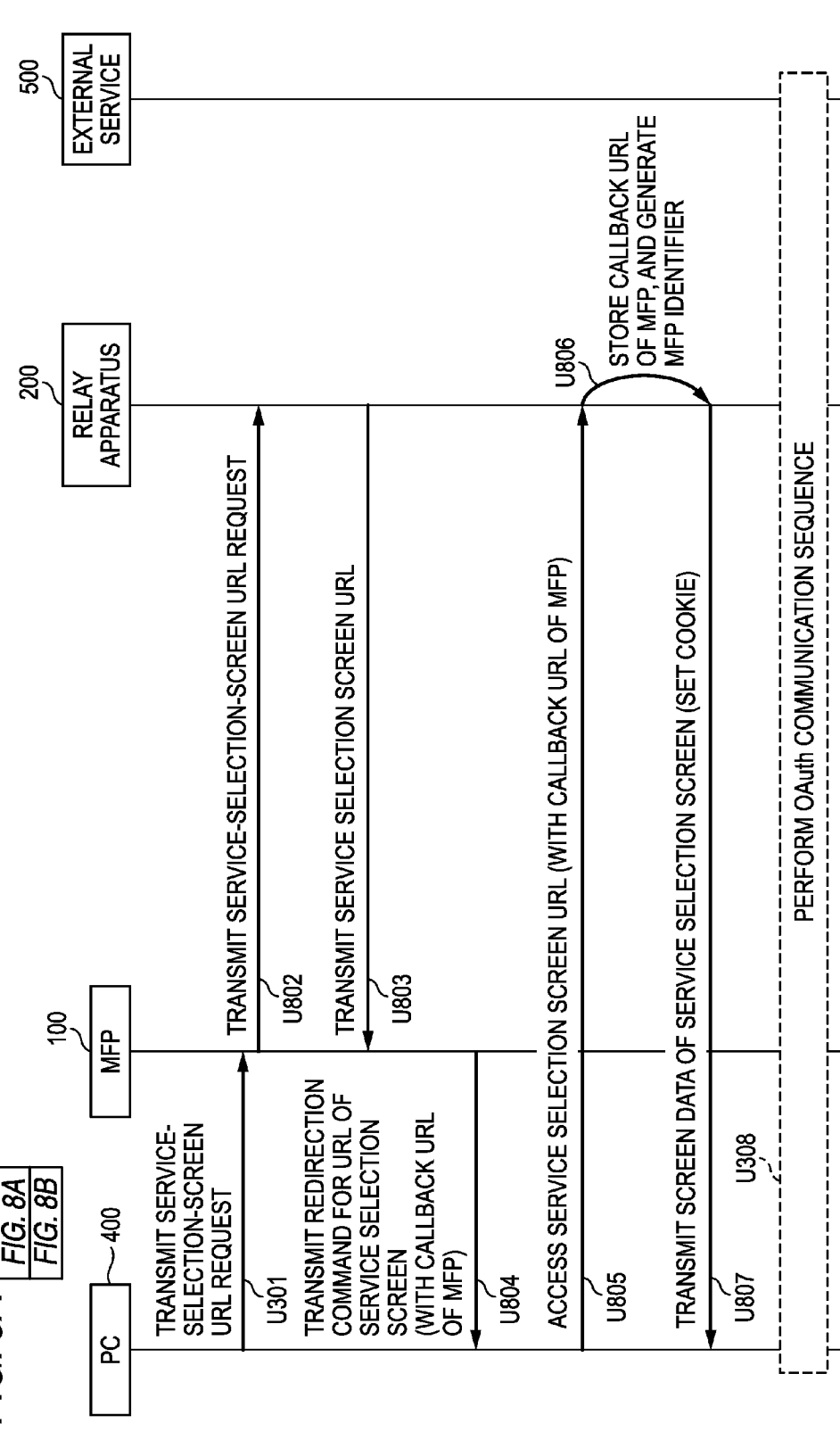

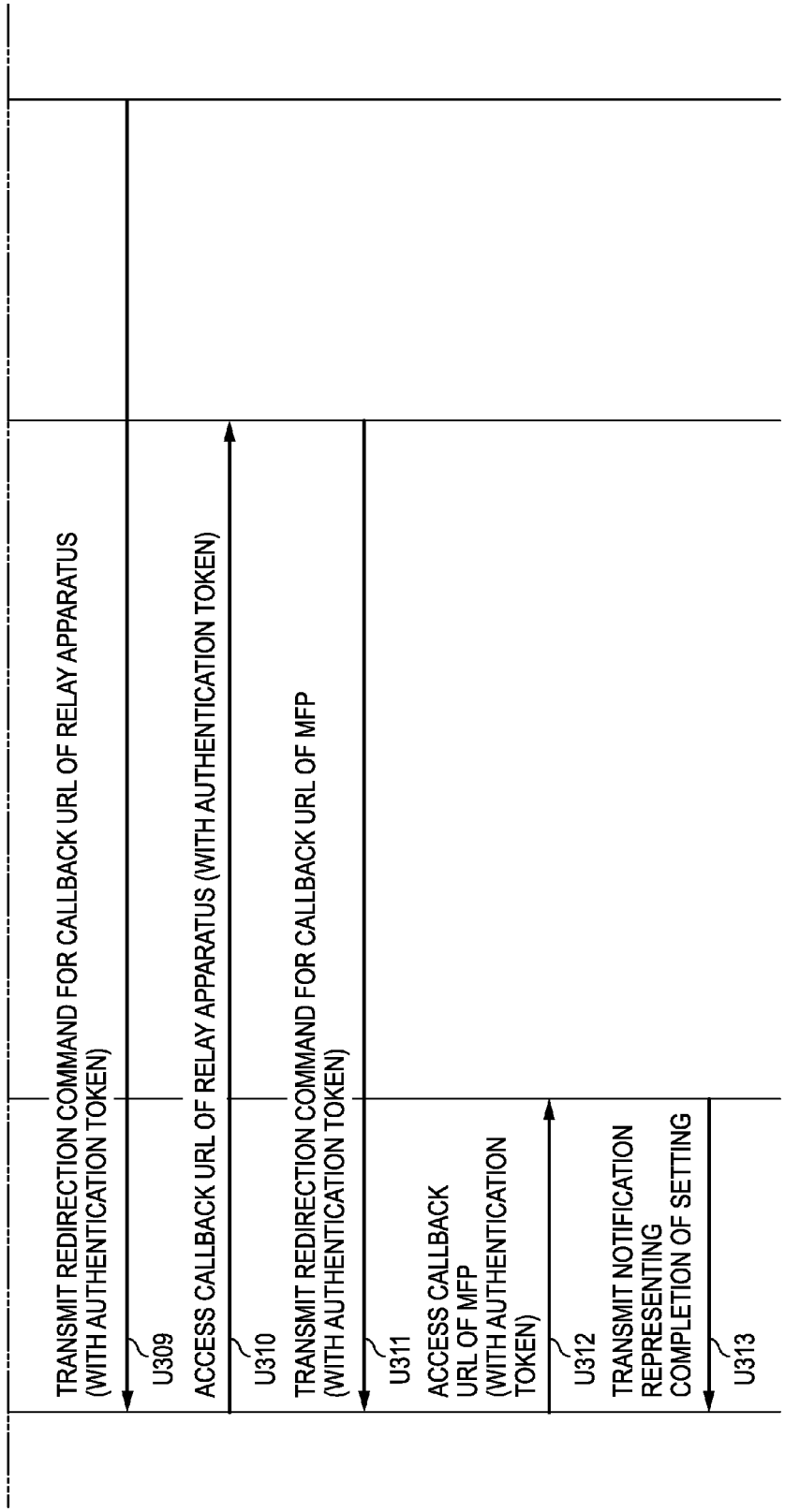

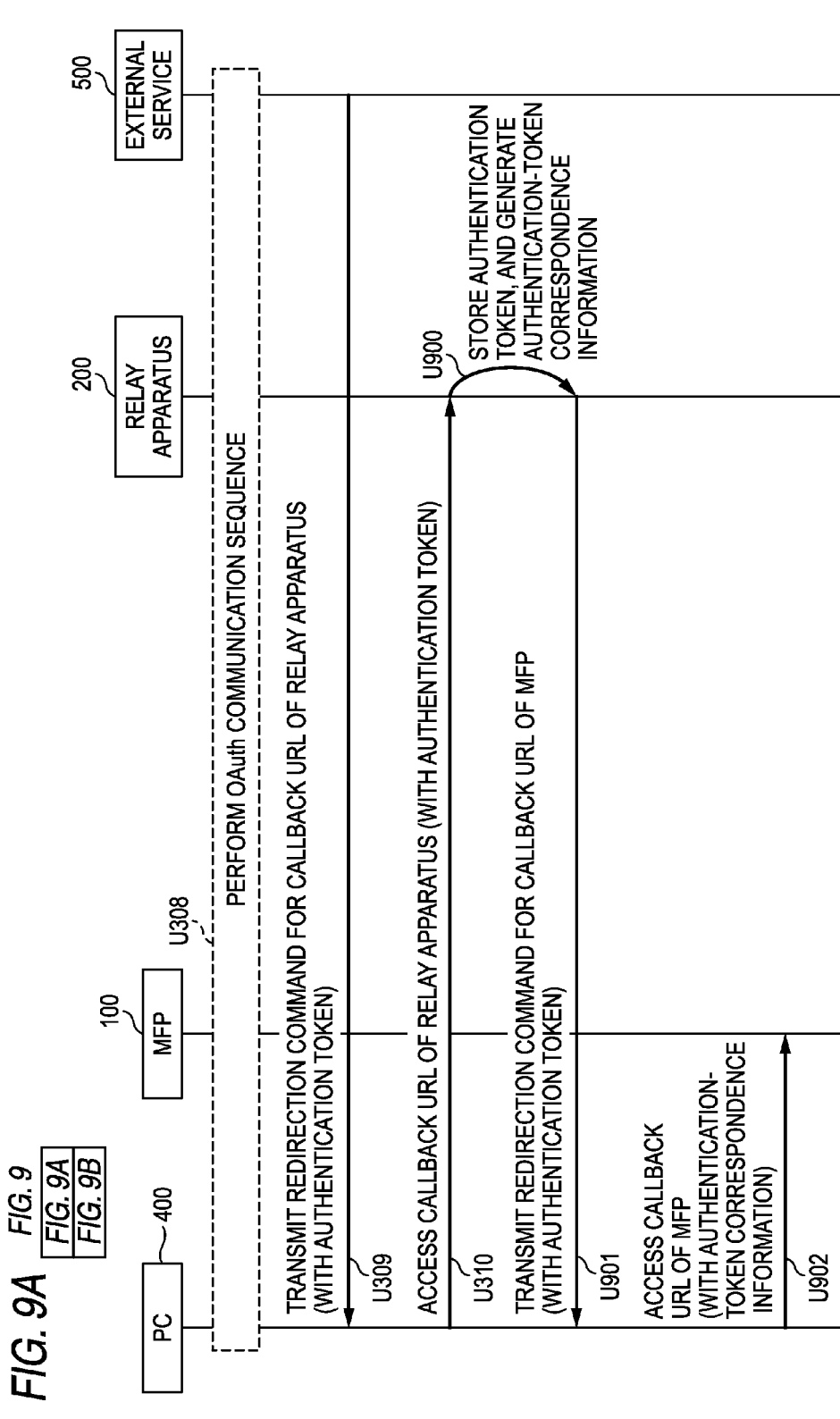

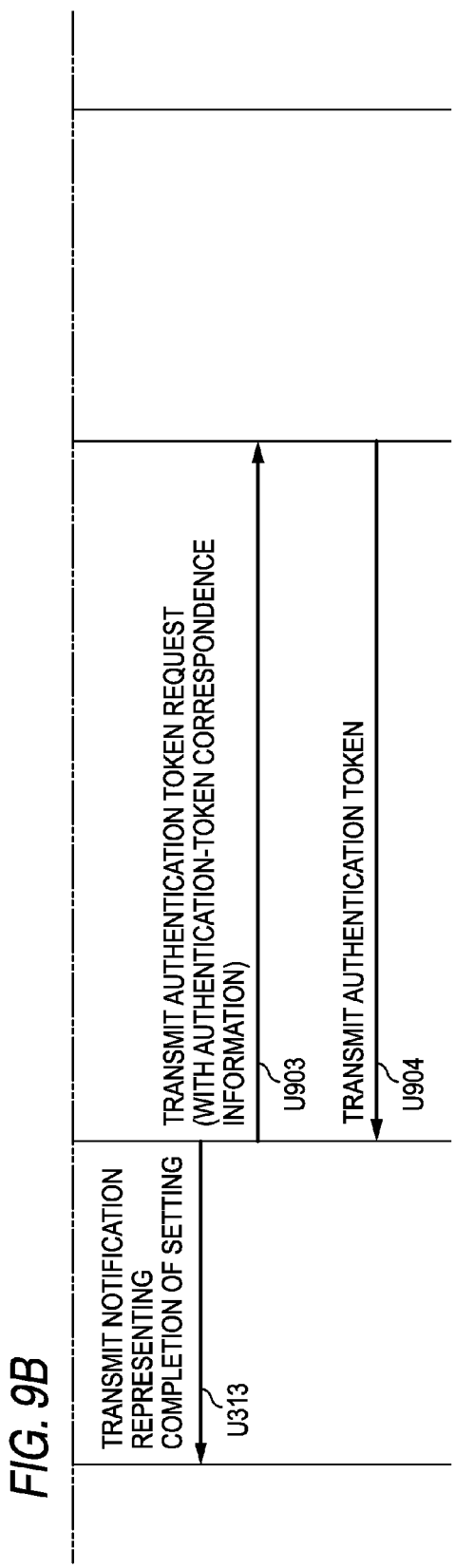

# COMMUNICATION SYSTEM FOR RECEIVING AUTHENTICATION DATA FROM AN EXTERNAL SERVICE

CROSS-REFERENCE TO RELATED APPLICATIONS

This application claims priority from Japanese Patent Application No. 2011-194455 filed on Sep. 7, 2011, the entire subject matter of which is incorporated herein by reference.

TECHNICAL FIELD

The present invention relates to a communication system.

BACKGROUND

There have been proposed an image reading apparatus for uploading an electronic file of a read image to a server. There have been proposed a printer for printing an electronic file downloaded from a server. In order to provide those services, makers of the image reading apparatus and the printer may provide dedicated servers on their own.

Web services capable of storing electronic files in databases prepared on networks by service providers have been in widespread use. For example, a Picasa (a registered trademark) web album and flickr (a registered trademark) are examples of the web services. Users can use communication devices having web browsers to upload or download desired electronic files in the web services.

Thus, the makers of image reading apparatuses or printers may configure the image reading apparatuses and the printers to be capable of direly using those web services, instead of providing the dedicated servers.

SUMMARY

In order to use those web services from apparatuses such as the image reading apparatuses and the printers, prior to using of the services, the apparatuses such as the image reading apparatuses and printers may need to conduct authentication with the web services, so as to get access permission from the web services. However, the authentication with the web services is generally conducted by using web browsers. Thus, it is difficult to get authentication data through an apparatus such that an image reading apparatus or a printer having no web browser.

Therefore, illustrative aspects of the present invention provide a communication system capable of making a communication device easily get authentication data of an external service, regardless of whether the communication device has a web browser or not.

According to one illustrative aspect of the present invention, there is provided a communication system comprising a communication device and a relay apparatus. The communication device and the relay apparatus are connected to a network that an external service is connected to. The communication device comprises: a communication unit configured to be connected to the network and to a browser-installed device, which comprises a browser unit and is connected to the network; and a controller. The controller of the communication device is configured to perform: a first transmitting process of transmitting data location information representing a location of predetermined data to the browser-installed device in response to a request from the browser-installed device connected by the communication unit; and an outputting process of outputting communication-device location information representing a location of the communication device. The relay apparatus comprises: a communication unit configured to be connected to the network; and a controller. The controller of the relay apparatus is configured to perform: a first receiving process of receiving a request based on the data location information from the browser-installed device; a second transmitting process of transmitting the predetermined data to the browser-installed device in response to the request based on the data location information received by the first receiving process; a first getting process of getting the communication-device location information output by the communication device that is connected to the browser-installed device which has transmitted the predetermined data; a first instructing process of instructing the browser-installed device to output the communication-device location information, which is communication-device location information of the communication device connected to the browser-installed device and is got by the first getting process, or correspondence information corresponding to the communication-device location information, to the relay apparatus; a second receiving process of receiving authentication data of the external service transmitted from the browser-installed device; a second getting process of getting the communication-device location information or the correspondence information corresponding to the communication-device location information output by the browser-installed device when the second receiving process receives the authentication data; and a second instructing process of instructing the browser-installed device to transmit the authentication data to the communication device represented by the communication-device location information got by the second getting process.

Incidentally, the present invention can implement a communication method, a communication device or a relay apparatus configuring a communication system, a control device for controlling a communication device or a relay apparatus, a program that is executable in a communication device or a relay apparatus, a recording medium for recording the program, and the like, in various forms.

BRIEF DESCRIPTION OF THE DRAWINGS

FIGS. 3A and 3B are sequence diagrams illustrating an authentication-token getting sequence;

FIGS. 5A to 5D are views illustrating structures of URLs that a relay apparatus receives;

FIGS. 6A and 6B are flow charts illustrating a rely process that the relay apparatus executes;

FIG. 7 is a flow chart illustrating a command performing process that the MFP executes;

FIGS. 8A and 8B are sequence diagrams illustrating an authentication-token getting sequence according to a second exemplary embodiment; and FIGS. 9A and 9B are sequence diagrams illustrating an authentication-token getting sequence according to a third exemplary embodiment.

DETAILED DESCRIPTION

Exemplary embodiments of the present invention will now be described with reference to the accompanying drawings.`

Figure 1:
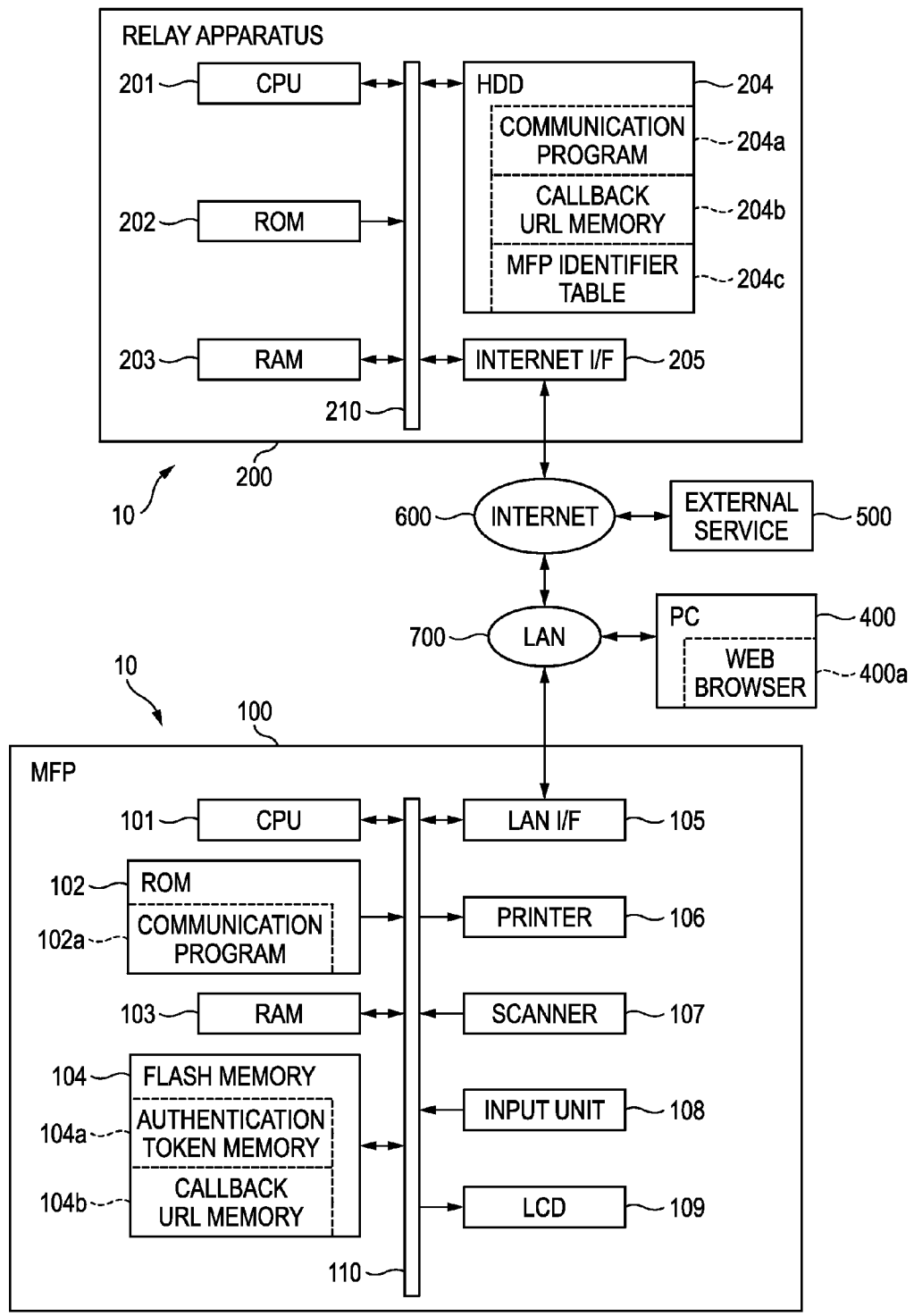
FIG. 1 is a block diagram schematically illustrating an electrical configuration of a service cooperation system according to an exemplary embodiment of the present invention.

FIG. 1 is a block diagram schematically illustrating an electrical configuration of a service cooperation system 10 according to a first exemplary embodiment of a communication system of the present invention. The service cooperation system 10 includes a multi-function peripheral 100 (hereinafter, referred to as an MFP 100) and a relay apparatus 200. The multi-function peripheral 100 has a digital multi-function peripheral having a printing function, a scanner function, a fax function, and a copy function. The relay apparatus 200 is a server provided by the maker of the MFP 100. A PC 400 is a personal computer owned by a user of the MFP 100. An external service 500 is a web server provided by a service provider. The service cooperation system 10 of the present exemplary embodiment is configured such that, even if the MFP 100 has no web browser, the MFP 100 can easily get an authentication token of the external service 500. The details will be described below.

The MFP 100, the relay apparatus 200, the PC 400, and the external service 500 are connected to one another through the Internet 600 and are configured to perform data transmission and reception with one another in accordance with HTTP. The Internet 600 may be made of an internet network. Further, the MFP 100 and the PC 400 are connected to each other a LAN 700, and are also connected to the Internet 600 through the LAN 700. On the Internet 600, a plurality of kinds of external services 500 exists; however, one external service 500 is shown in FIG. 1.

The MFP 100 includes a CPU 101, a ROM 102, a RAM 103, a flash memory 104, a LAN interface (I/F) 105, a printer 106, a scanner 107, an input unit 108, and a liquid crystal device (LCD) 109, which are connected to one another through bus lines 110.

The CPU 101 executes processes in accordance with programs stored in the ROM 102. The ROM 102 is a memory for storing programs and the like for controlling an operation of the MFP 100. The ROM 102 stores a communication program 102a. The MFP 100 executes a command performing process (FIG. 7) (which will be described later) in accordance with the communication program 102a. The communication program 102a is a program for performing data transmission and reception according to HTTP, and acts as an XML parser for interpreting XML; however, the communication program 102a does not act as an HTML parser for interpreting HTML. In the present exemplary embodiment, it is assumed that the MFP 100 is unable to interpret information written in HTML so as not to display web pages provided by the external service 500.

The RAM 103 temporarily stores information necessary for the processes of the CPU 101. The flash memory 104 is a non-volatile memory. The flash memory 104 includes an authentication token memory 104a and a callback URL memory 104b. The details will be described below with reference to FIG. 3. If the PC 400 performs an authentication procedure with the external service 500 in accordance with OAuth that is an example of an authentication protocol, the external service 500 issues an authentication token representing permission for resource use. The MFP 100 gets the authentication token of the external service 500 through the PC 400 and stores the authentication token in the authentication token memory 104a. Next, the MFP 100 uses the authentication token to use a resource of the external service 500.

The callback URL memory 104b stores an URL (hereinafter, referred to as a callback URL of the MFP) set as an URL representing the location of the MFP 100 in order for the MFP 100 to get an authentication token.

The LAN I/F 105 is an interface for performing communication with another apparatus through the LAN 700. The LAN I/F 105 connects the MFP 100 and the PC 400 through the LAN. The printer 106 is an apparatus for printing images. The scanner 107 is an apparatus for reading images. The input unit 108 is composed of operation keys or a touch panel for inputting an instruction or information to the MFP 100. The LCD 109 displays various kinds of information.

The relay apparatus 200 includes a CPU 201, a ROM 202, a RAM 203, a hard disk drive (HDD) 204, and an Internet interface (I/F) 205, which are connected to one another through bus lines 210.

The CPU 201 executes processes in accordance with programs which are stored in the ROM 202 or the HDD 204. The ROM 202 stores programs and the like for controlling an operation of the relay apparatus 200. The RAM 203 temporarily stores data necessary for the processes of the CPU 201.

The HDD 204 is a rewritable non-volatile storage device. The HDD 204 includes a communication program 204a, a callback URL memory 204b, and an MFP identifier table 204c. The communication program 204a is a program for transmitting and receiving HTTP messages. The relay apparatus 200 performs a relay process (FIG. 6) (which will be described later) in accordance with that communication program 204a.

In the callback URL memory 204b, an URL (hereinafter, referred to as a callback URL of the relay apparatus) for enabling the relay apparatus 200 to receive an authentication token from the PC 400 is set. The MFP identifier table 204c is a table that stores the callback URL of the MFP. The MFP identifier table 204c will be described below with reference to FIG. 2. The Internet I/F 205 is a unit for performing communication with another apparatus connected to the Internet 600.

The PC 400 includes a web browser 400a installed therein. The PC 400 is configured to be capable of displaying web pages that are provided by various web servers such as the external service 500. In the service cooperation system 10 of the present exemplary embodiment, the PC 400 performs an authentication procedure through the relay apparatus 200.

Figure 2:
FIG. 2 is a view illustrating an example of a structure of a multi-function-peripheral (MFP) identifier table.

FIG. 2 is a view schematically illustrating the structure of the MFP identifier table 204c provided in the relay apparatus 200. The details will be described below with reference to FIG. 3, but the relay apparatus 200 gets the callback URL of the MFP connected with the PC 400 through the LAN, through the PC 400. Then, the relay apparatus 200 stores an arbitrary character string (hereinafter, referred to as an MFP identifier) in association with the got callback URL in the MFP identifier table 204c.

The MFP identifier may be stored as a value of a cookie in the PC 400 that is a client. Then, when the PC 400 transmits data to the relay apparatus 200 for the second or subsequent time, the PC 400 transmits the MFP identifier as the value of the cookie to the relay apparatus 200. Therefore, on the basis of the MFP identifier, the relay apparatus 200 can get the callback URL of the MFP 100 connected to the PC 40.

FIG. 3 is a sequence diagram illustrating an authentication-token getting sequence that is performed among the PC 400, the MFP 100, the relay apparatus 200, and the external service 500. It is assumed that, prior to starting that process, the user connects the PC 400 to the external service 500 so as to make the external service 500 issue an account name and a password. Incidentally, requests and responses are included in HTTP messages, which are transmitted and received among the apparatuses shown in FIG. 3.

First, in STEP U301, the PC 400 transmits an HTTP message to request a URL (hereinafter, referred to as a service selection screen URL) representing the location of screen data for displaying a service selection screen, to the MFP 100 connected with the PC 400 through the LAN. In response to the request from the PC 400, in STEP U302, the MFP 100 transmits a service-selection-screen URL request to the relay apparatus 200.

FIG. 5A is a view illustrating an example of a designation URL included in the service-selection-screen URL request. As shown in FIG. 5A, a designation URL 501 includes a request reception URL 502 and a query character string 503. The MFP 100 stores the request reception URL 502 for enabling the relay apparatus 200 to receive the service-selection-screen URL request, in advance. Then, the MFP 100 adds the query character string 503 including the callback URL of the MFP as a parameter, to the request reception URL 502 stored in advance, so as to generate the designation URL 501. The MFP 100 outputs the service-selection-screen URL request to the generated designation URL.

The query character string 503 includes: a character string 504 representing that the query character string 503 includes the callback URL; and a callback URL 505. However, due to limitation of HTTP, there is a restriction on the kinds of characters that can be included in the query character string 503. Therefore, the MFP 100 performs URL encoding on the callback URL of the MFP to generate the callback URL 505 so that the query character string 503 includes the encoded callback URL 505.

Referring to FIG. 3 again, the description will continue. In the example shown in FIG. 3, as the relay apparatus 200, relay apparatuses A and B are shown. All of the relay apparatuses A and B are severs installed by the maker of the MFP 100, and provide the same service; however, in the example of FIG. 3, it is assumed that the relay apparatus A is inaccessible due to the disruption, and the relay apparatus B is accessible. In this case, the MFP 100 transmits the service-selection-screen URL request to the relay apparatus B and gets the service selection screen URL from the relay apparatus B. Hereinafter, the relay apparatus B that the MFP 100 was capable of accessing will be referred to simply as the relay apparatus 200.

When receiving the service-selection-screen URL request from the MFP 100, the relay apparatus 200 decodes the callback URL 505 of the designation URL 501 (FIG. 5A) included in the corresponding request so as to get the callback URL of the MFP. Then, in STEP U303, the relay apparatus 200 generates an MFP identifier corresponding to the callback URL of the MFP and stores the MFP identifier in association with the callback URL of the MFP in the MFP identifier table 204c. Next, in STEP U304, the relay apparatus 200 adds the MFP identifier to the service selection screen URL and transmits the service selection screen URL to the MFP 100.

FIG. 5B is a view illustrating an example of a service selection screen URL having an MFP identifier added thereto. As shown in FIG. 5B, the relay apparatus 200 may add a query character string 511 designating an MFP identifier 'AAA' as a parameter, to the end of a service selection screen URL 510, so that the relay apparatus 200 is capable of transmitting the MFP identifier to the MFP 100.

Referring to FIG. 3 again, the description will continue. When the MFP 100 gets the service selection screen URL including the MFP identifier from the relay apparatus 200, in STEP U305, the MFP 100 transmits a redirection command including the service selection screen URL to the PC 400. In STEP U306, in accordance with the redirection command, the PC 400 accesses the service selection screen URL of the relay apparatus 200 and requests a service selection screen. Therefore, according to the present exemplary embodiment, since the MFP 100 gets the service selection screen URL from the relay apparatus 200 and transmits the service selection screen URL to the PC 400, the PC 400 can access the relay apparatus 200 having been accessed by the MFP 100 on the basis of the service selection screen URL. In other words, even in a distributed environment where a plurality of relay apparatuses 200 exist, the PC 400 can request a service selection screen from the relay apparatus 200 (the relay apparatus B in the example shown in FIG. 3) storing the MFP identifier and the callback URL of the MFP.

Upon receiving the request based on the service selection screen URL including the MFP identifier, from the PC 400, the relay apparatus 200 extracts the MFP identifier from the query character string 511 (see FIG. 5B) included in the service selection screen URL 510. Then, in STEP U307, the relay apparatus 200 transmits screen data for displaying a service selection screen composed of a web page, to the PC 400. In other words, the relay apparatus 200 makes the PC 400 get the screen data stored in advance in the HDD 204. Here, when transmitting the screen data, the relay apparatus 200 sets a cookie, and when the PC 400 transmits the HTTP message to the relay apparatus 200, the relay apparatus 200 instructs the web browser 400a of the PC 400 to output the MFP identifier as the value of the cookie.

As a result, in STEP U307 and the subsequent steps, the relay apparatus 200 can transmit an MFP identifier whenever receiving an HTTP message from the PC 400, and can get the callback URL of the MFP connected with the PC 400 through the LAN on the basis of the MFP identifier.

The PC 400 displays the service selection screen using the screen data having been received from the relay apparatus 200 and performs an authentication procedure with the external service 500 selected in the service selection screen by the user. An OAuth communication sequence of STEP U308 representing the detailed sequence of the authentication procedure will be described later with reference to FIG. 4.

If the authentication procedure between the PC 400 and the external service 500 is successful, in STEP U309, the external service 500 transmits a redirection command for the relay apparatus 200, to the PC 400. This redirection command includes the authentication token issued by the external service and the callback URL of the relay apparatus. For example, the authentication token is added as a query character string to the callback URL of the relay apparatus.

In STEP U310, the PC 400 receives the redirection command from the external service 500, accesses the relay apparatus 200 and transmits the authentication token to the relay apparatus 200. This can be implemented, for example, by connecting the PC 400 to the callback URL of the relay apparatus including the authentication token as a query character string. In this case, the PC 400 outputs (transmits) the MFP identifier as the value of the cookie to the relay apparatus 200.

By receiving the authentication token from the PC 400, the relay apparatus 200 can determine that the authentication procedure has been performed between the PC 400 and the external service 500. Then, on the basis of the MFP identifier got as the value of the cookie, the relay apparatus 200 reads the callback URL of the MFP corresponding to the MFP identifier, from the MFP identifier table 204c. Next, in STEP U311, the relay apparatus 200 transmits a redirection command including the designated callback URL of the MFP, with the authentication token, to the PC 400, so as to instruct the PC 400 to transmit the authentication token to the MFP 100.

In STEP U312, on the basis of the redirection command, the PC 400 accesses the callback URL of the MFP connected with the PC 400 through the LAN and transmits the authentication token. Upon getting the authentication token, the MFP 100 stores the got authentication token in the authentication token memory 104a. Then, in STEP U313, the MFP 100 transmits a notification representing that the setting has been completed, to the PC 400.

According to the present exemplary embodiment, the user can perform the authentication procedure with the external service 500, using the web browser 400a of the PC 400. If the authentication procedure is successful, the external service 500 issues the authentication token and transmits the authentication token to the MFP 100 through the relay apparatus 200 and the PC 400. Therefore, even in a case where the MFP 100 has no web browser, it is possible to enable the MFP 100 to easily get the authentication token. Further, in the case where the MFP 100 has no web browser, high processing capacity is not required, and thus it is possible to suppress the manufacturing cost of the MFP 100.

In a case of obtaining authentication with a password or an account name to use the external service 500, a web browser is often required for displaying a login page. However, according to the MFP 100 of the present exemplary embodiment, the authentication can be obtained with an authentication token instead of the password or the account name. Therefore, even if there is no web browser so that any login page cannot be displayed, it is possible to obtain the authentication of the external service 500.

Further, according the present exemplary embodiment, the relay apparatus 200 gets the callback URL of the MFP on the basis of the MFP identifier got as the value of the cookie and transmits the redirection command including the designated callback URL of the MFP to the PC 400. Therefore, even if the web browser 400a of the PC 400 is a general-purpose web browser, it is possible to make the PC 400 transmit an authentication token to the MFP 100.

Figure 4:
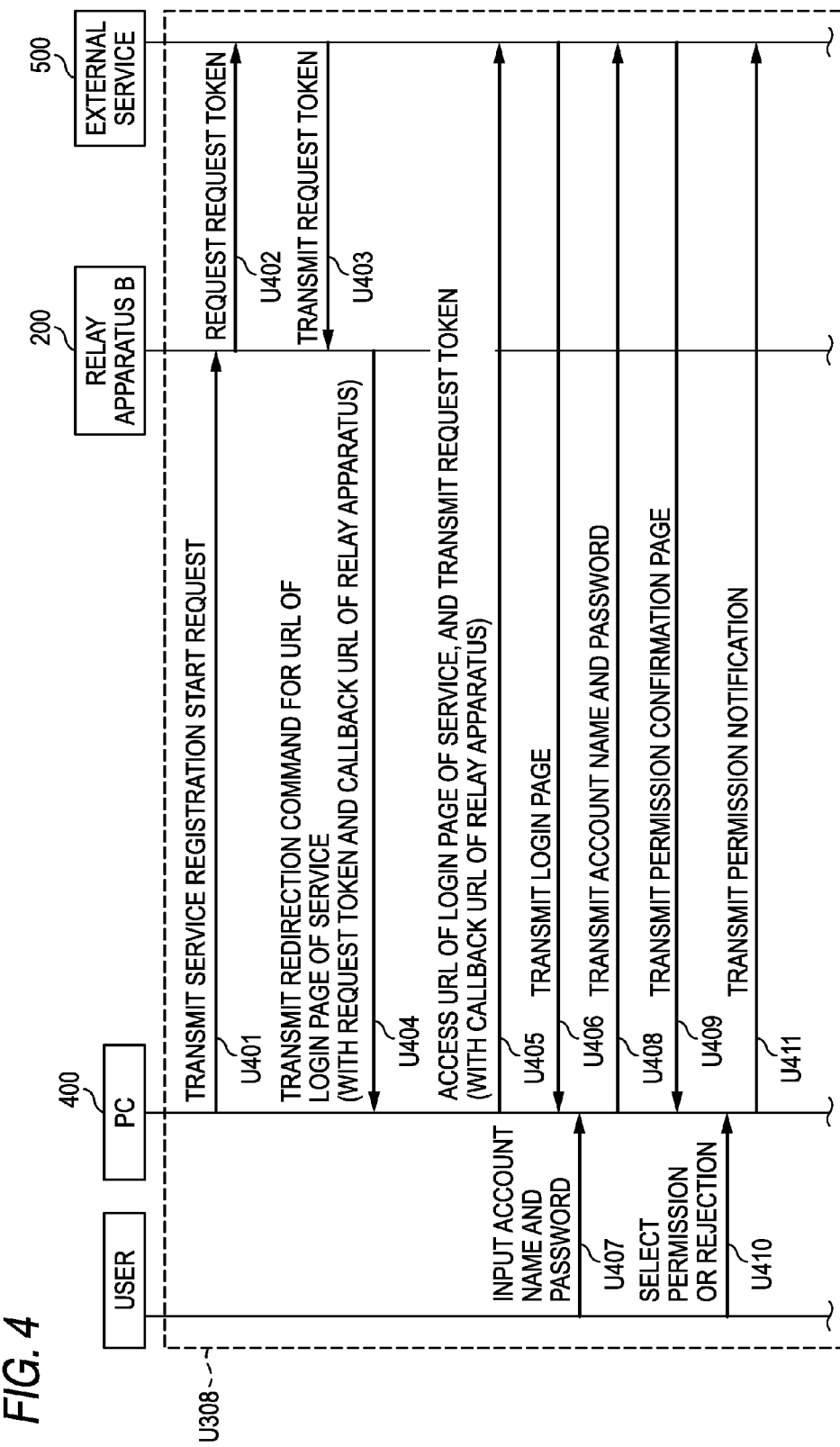
FIG. 4 is a sequence diagram illustrating an OAuth communication sequence.

FIG. 4 is a sequence diagram illustrating the OAuth communication sequence of STEP U308. As described with reference to FIG. 3, upon receiving the screen data of the service selection screen from the relay apparatus 200 in STEP U307, on the basis of the received screen data, the PC 400 displays the service selection screen by the function of the web browser 400a. The screen data is generated in a markup language such as HTML, an XML text, or the like, and includes a designation URL 520 (which will be described later with reference to FIG. 5C). The service selection screen is a screen for enabling the user to select any one from the services existing on the Internet 600.

Next, in STEP U401, the PC 400 transmits a registration start request for the service selected from the services displayed as choices on the service selection screen by the user, to the relay apparatus 200.

FIG. 5C is a view illustrating an example of the designation URL 520 included in the registration start request. The designation URL 520 includes a character string (for example, 'service1') designating an external service and is associated with a choice of the service selection screen as a link. When the user clicks a choice on the service selection screen of the PC 400, the PC 400 transmits a registration start request including the designation URL 520 that is a link associated with the corresponding choice, to the relay apparatus 200.

Upon receiving the registration start request, in STEP U402, the relay apparatus 200 transmits a request-token acquisition request to the external service 500 that provides the service selected in the PC 400 (that is, the service designated by the designation URL 520 received by the relay apparatus 200). In STEP U403, in response to the request-token acquisition request, the external service 500 transmits a request token to the relay apparatus 200. Incidentally, according to the kind of the external service 500, transmission and reception of a request token may be unnecessary. Next, in STEP U404, the relay apparatus 200 transmits a redirection command for a URL of a login page disclosed by the external service 500, to the PC 400 which is the registration start requestor. This redirection command includes the request token received from the external service 500 by the relay apparatus 200, and the callback URL of the relay apparatus. FIG. 5D is a view illustrating an example of a callback URL 530 of a relay apparatus.

Referring to FIG. 4 again, the description will continue. Upon receiving the redirection command, in STEP U405, the PC 400 accesses the URL of the login page of the external service 500 and transmits the request token received from the relay apparatus 200, to the external service 500. In STEP U406, the external service 500 transmits the login page to the PC 400 which is the request token transmitter. The login page is a web page having input boxes for an account name and a password.

When the account name and the password registered for the service are input in the login page displayed in the PC 400 in STEP U407, in STEP U408, the PC 400 transmits the account name and the password to the external service 500. In STEP U409, the external service 500 checks whether those account name and password correspond to the combination of the account name and the password issued in advance for the service. If it is determined that those account name and password correspond to the combination of the account name and the password issued in advance for the service, in STEP U409, the external service 500 transmits a permission confirmation page to the PC 400. This permission confirmation page is a web page for inquiring of the user about whether to permit the relay apparatus 200 to use the external service 500 with the input account name.

If the user of the PC 400 permits the relay apparatus 200 to use the external service 500 in the permission confirmation page in STEP U410, in STEP U411, the PC 400 transmits a permission notification to the external service 500. Then, the authentication procedure between the PC 400 and the external service 500 is completed, and the external service 500 issues the authentication token in STEP U309 of FIG. 3.

FIG. 6 is a flow chart illustrating a relay process that is performed by the relay apparatus 200. The relay process is performed in accordance with the communication program 204a by the CPU 201, and is a process for implementing the authentication-token getting sequence shown in FIG. 3. This process is repeatedly performed during start-up of the relay apparatus 200.

First, if the service-selection-screen URL request is received from the MFP 100 (Yes in STEP S601), in STEP S602, the CPU 201 gets the callback URL of the MFP received with the corresponding request. Specifically, as described with reference to FIG. 5A, the designation URL 501 included as a destination in the service-selection-screen URL request includes the request reception URL 502. Therefore, in a case where the received designation URL includes the request reception URL 502, the CPU 201 performs the process of STEP S602 and the subsequent processes. Then, the CPU 201 recognizes the character string next to '=' in the query character string 503 included in the designation URL 501, as the callback URL 505. Incidentally, since the callback URL 505 is a result of the URL encoding, the CPU 201 decodes the character string recognized as the callback URL 505 so as to get the callback URL of the MFP. Next, in STEP S603, the CPU 201 generates the MFP identifier and stores the MFP identifier in association with the callback URL of the MFP in the MFP identifier table 204c. Subsequently, the CPU 201 transmits the service selection screen URL and the MFP identifier to the MFP 100. Specifically, in STEP S604, the CPU 201 adds the query character string 511 representing the MFP identifier as a parameter, to the service selection screen URL 510 so as to generate an URL (see FIG. 5B), and transmits the URL to the MFP 100. Then, the CPU 201 returns to STEP S601.

If there is no service-selection-screen URL request (No in STEP S601) and there is access of the PC 400 to the service selection screen URL (Yes in STEP S605), specifically, if a request having the URL received from the PC 400 as a destination is received, in STEP S606, the CPU 201 gets the MFP identifier included as the query character string 511 in the URL received from the PC 400. Next, the CPU 201 sets the MFP identifier as the value of the cookie in STEP S607 and transmits the screen data of the service selection screen and the cookie to the PC 400 in STEP S608. Then, the CPU 201 returns to STEP S601.

If there is no access to the service selection screen URL (No in STEP S605) and a service registration start request is received (Yes in STEP S609), specifically, if a request having the designation URL 520 described with reference to FIG. 5C as a destination is received, the CPU 201 requests a request token from the external service 500 in STEP S610 and gets the request token transmitted from the external service 500 in response to the corresponding request in STEP S611. For example, the external service 500 transmits an XML text including the request token to the relay apparatus 200. The CPU 201 reads the request token from the XML text. Next, in STEP S612, the CPU 201 transmits a redirection command for the URL of the login page disclosed by the external service 500, to the PC 400 which is the registration start requestor. This redirection command includes the URL of the login page as a redirection destination. The URL of the login page includes: a query character string (not shown) representing the callback URL 530 of the relay apparatus; and a query character string representing the request token got in STEP S611. Then, the CPU 201 returns to STEP S601.

If there is no service registration start request (No in STEP S609) and there is access of the PC 400 to the callback URL 530 of the relay apparatus 200 (Yes in STEP S613), in STEP S614, the CPU 201 gets the authentication token transmitted from the PC 400. Specifically, the CPU 201 reads the authentication token included as the query character string in the callback URL 530 of the relay apparatus 200 included in the HTTP message received from the PC 400. Then, in STEP S615, the CPU 201 gets the MFP identifier from the cookie included in the header of the HTTP message received from the PC 400 and extracts the callback URL of the MFP corresponding to the MFP identifier, from the MFP identifier table 204c. Next, in STEP S616, the CPU 201 transmits the redirection command having the callback URL designated as a destination, and the authentication token, to the PC 400. Incidentally, if the PC 400 receives the redirection command from the relay apparatus 200, the PC 400 transmits the authentication token to the MFP 100 corresponding to the callback URL included in the redirection command. Then, the CPU 201 returns to STEP S601. If there is no access to the callback URL 530 of the relay apparatus (No in STEP S613), the CPU 201 performs another process in STEP S617 and returns to STEP S601.

FIG. 7 is a flow chart illustrating a command performing process that is performed by the CPU 101 of the MFP 100. The command performing process is repeatedly performed after a power supply of the MFP 100 is activated, and is a process for implementing the authentication-token getting sequence shown in FIG. 3.

First, if there is a service-selection-screen URL request from the PC 400 (Yes in STEP S701), the CPU 101 transmits the service-selection-screen URL request and the callback URL of the MFP to the relay apparatus 200. Specifically, the MFP 100 stores the request reception URL 502 of the relay apparatus 200 in advance, and the MFP 100 adds the query character string 503 including the encoded callback URL of the MFP as a parameter after the request reception URL 502, so as to generate the designation URL 501. Then, in STEP S702, the CPU 101 transmits the service-selection-screen URL request to the designation URL 501 (FIG. 5A). Next, in STEP S703, the CPU 101 gets the service selection screen URL transmitted from the relay apparatus 200 and the MFP identifier included in the service selection screen URL. Then, the CPU 101 transmits the redirection command including the service selection screen URL (see FIG. 5B) including the MFP identifier, to the PC 400, in STEP S704, and returns to STEP S701.

If there is no service-selection-screen URL request (No in STEP S701) and there is no access to the callback URL of the MFP (Yes in STEP S705), the CPU 101 gets the authentication token transmitted from the PC 400 in STEP S706 and stores the authentication token in the authentication token memory 104a in STEP S707. Then, the CPU 101 transmits the notification representing that the setting has been completed, in STEP S708, and returns to STEP S701.

If there is no access to the callback URL of the MFP (No in STEP S705), in STEP S709, the CPU 101 performs another process. For example, the CPU 101 may use the got authentication token to perform a process using the external service 500.

According to the first exemplary embodiment, even if the MFP 100 has no web browser, it is possible to make the MFP 100 to easily get the authentication token.

Referring to FIG. 8, a second exemplary embodiment of the present invention will now be described. A block diagram illustrating an electrical configuration of a service cooperation system 10 of the second exemplary embodiment is the same as that of the first exemplary embodiment, and thus description and illustration thereof will be omitted. Identical components of the second exemplary embodiment to those of the first exemplary embodiment are denoted by the same reference symbols, and detailed description thereof will be omitted.

FIG. 8 is a sequence diagram illustrating an authentication-token getting sequence, and corresponds to FIG. 3. The authentication-token getting sequence shown in FIG. 8 is the same as that of the first exemplary embodiment, except that STEPS U802 to U807 are performed instead of STEPS U302 to U307 of the first exemplary embodiment shown in FIG. 3.

In the above-described first exemplary embodiment, when requesting the service selection screen URL from the relay apparatus 200, the MFP 100 transmits the callback URL of the MFP to the relay apparatus 200 in STEP U302 and receives the service selection screen URL including the MFP identifier in STEP U304. On the other hand, in the second exemplary embodiment, when requesting the service selection screen URL, in STEP U802, the MFP 100 does not transmit the callback URL of the MFP to the relay apparatus 200. Further, in STEP U803, the MFP 100 does not add the MFP identifier to the service selection screen URL received from the relay apparatus.

Instead, in STEP U804, the MFP 100 of the second exemplary embodiment adds the callback URL of the MFP to the service selection screen URL to be transmitted to the PC 400, so as to output the callback URL of the MFP. Specifically, the MFP 100 adds a query character string including the encoded callback URL of the MFP to the service selection screen URL received from the relay apparatus 200 and transmits the service selection screen URL to the PC 400. Then, when the PC 400 accesses the service selection screen URL received from the MFP 100 and requests a service selection screen, in STEP U805, the PC 400 transmits the service selection screen URL (the service selection screen URL including the query character string representing the callback URL of the MFP) to the relay apparatus 200.

That is, according to the second exemplary embodiment, when receiving a request based on the service selection screen URL from the PC 400, the relay apparatus 200 gets the callback URL of the MFP included in the service selection screen URL. Then, the relay apparatus 200 stores the got callback URL of the MFP in the MFP identifier table 204c. Next, in STEP U806, the relay apparatus 200 generates the MFP identifier and stores the MFP identifier in association with the callback URL of the MFP in the MFP identifier table 204c.

Next, in STEP S807, the relay apparatus 200 instructs the web browser 400a to set a cookie when the relay apparatus 200 transmits the screen data corresponding to the service selection screen URL to the PC 400, and to transmit the MFP identifier as the value of the cookie when the PC 400 transmits data to the relay apparatus 200. Then, whenever the relay apparatus 200 receives a HTTP message from the PC 400, the relay apparatus receives the MFP identifier and gets the callback URL of the MFP connected to the PC 400 through the LAN on the basis of the MFP identifier.

According to the second exemplary embodiment, it is possible to make the relay apparatus 200 get the callback URL of the MFP transmitted to the PC 400 by the MFP 100, through the PC 400. Therefore, the relay apparatus 200 can use the callback URL of the MFP to enable the MFP 100 to get the authentication token, and thus can achieve the same effects as those of the first exemplary embodiment.

Referring to FIG. 9, a third exemplary embodiment will now be described. A block diagram illustrating an electrical configuration of a service cooperation system 10 of the third exemplary embodiment is the same as that of the first exemplary embodiment, and thus description and illustration thereof will be omitted. Identical components of the third exemplary embodiment to those of the first exemplary embodiment are denoted by the same reference symbols, and detailed description thereof will be omitted.

FIG. 9 is a sequence diagram illustrating an authentication-token getting sequence, and corresponds to FIG. 3. The authentication-token getting sequence shown in FIG. 9 is the same as that of the first exemplary embodiment except that STEPS U900 to U904 are performed instead of STEPS U311 and U312 of the first exemplary embodiment shown in FIG. 3.

In the above-described first exemplary embodiment, the relay apparatus 200 receives the authentication token from the PC 400 and transmits the authentication token to the MFP 100 through the PC 400 in STEPS U310 to U312. On the other hand, in the third exemplary embodiment, upon receiving the authentication token from the PC 400 in STEP U310, in STEP U900, the relay apparatus 200 stores the received authentication token in the HDD 204 (FIG. 1). Further, in STEP U900, the relay apparatus 200 generates information corresponding to the authentication token (hereinafter, referred to as authentication-token correspondence information) and stores the authentication-token correspondence information in association with the authentication token in the HDD 204. Then, the relay apparatus 200 transmits the redirection command, which includes the callback URL of the MFP designated as a redirection destination, and the authentication-token correspondence information to the PC 400. Specifically, the relay apparatus 200 adds a query character string including the authentication-token correspondence information to the callback URL of the MFP designated as the redirection destination, and the relay apparatus 200 transmits the callback URL of the MFP. Then, the relay apparatus 200 can instruct the PC 400 to transmit the authentication-token correspondence information to the MFP 100 in STEP U901.

Next, on the basis of the redirection command, in STEP U902, the PC 400 accesses the callback URL of the MFP connected to the PC 400 through the LAN and transmits the authentication-token correspondence information. Specifically, the PC 400 transmits the callback URL of the MFP including in the query character string including the authentication-token correspondence information. Then, the MFP 100 gets the authentication-token correspondence information from the query character string and stores the authentication-token correspondence information in the flash memory 104. Then, the MFP 100 transmits the notification representing that the setting has been completed, to the PC 400, in STEP U313.

Then, in a case where the MFP 100 accesses the external service 500, as advance preparation, in STEP U903, the MFP 100 transmits the authentication-token correspondence information to the relay apparatus 200 so as to request the authentication token. Meanwhile, when receiving the authentication-token correspondence information from the MFP 100, in STEP U904, the relay apparatus 200 reads the authentication token, which is stored in association with the authentication-token correspondence information, and transmits the authentication token to the MFP 100. The MFP 100 can use the authentication token received from the relay apparatus 200 to access the external service 500.

According to the third exemplary embodiment, it is possible to enable the MFP 100 to get the authentication token, and thus achieve the same effects as those of the first exemplary embodiment. The MFP 100 may store the authentication-token correspondence information instead of the authentication token. Therefore, for example, in a case where the data size of the authentication token issued by the external service 500 exceeds the capacity of the authentication token memory 104a provided in the MFP 100, the relay apparatus 200 may generate the authentication-token correspondence information, which has a data size smaller than that of the authentication token, and transmit the authentication-token correspondence information to the MFP 100.

In the above-described exemplary embodiments, the service cooperation system 10 is an example of the communication system, the MFP 100 is an example of the communication apparatus, and the PC 400 is an example of the browser-installed device. The web browser 400a is an example of a browser unit. The Internet 600 is an example of a network. The LAN I/F 105 of the MFP 100 is an example of a connecting unit, a first transmitting process, and an outputting process. The LAN I/F 205 of the relay apparatus 200 is an example of a first receiving process and a second transmitting process. The service selection screen URL is an example of data location information. The callback URL of the MFP is an example of the communication-device location information. The MFP identifier is an example of the correspondence information. The CPU 201 executing step S602 is an example of a first getting process. The CPU 201 executing step S608 is an example of a first instructing process. The CPU 201 executing step S615 is an example of a second getting process. The CPU 201 executing step S616 is an example of a second instructing process. The CPU 101 executing step S703 is an example of a data-location-information getting process. The CPU 101 executing step S702 is an example of a data-location-information requesting process. The CPU 201 executing step S603 is an example of a second storage control process and a second correspondence-information generating process. The CPU 201 executing step S604 is an example of a data-location-information transmitting process. In the second exemplary embodiment, the CPU 201 executing step S806 is an example of a first storage control process and a first correspondence-information generating process.

Although the present invention has been described on the basis of the exemplary embodiments, it is easily inferable that the present invention is not limited to the above-described exemplary embodiments. Various modifications for improvement can be made without departing from the scope of the invention.

For example, in the above-described exemplary embodiments, the MFP 100 is an example of the communication device; however, various devices such as a portable phone and a digital camera can be examples of the communication device. Further, the relay apparatus may be a virtual machine (for example, EC2 of Amazon (a registered trademark)) acting as a server in cooperation with a plurality of physical apparatuses, or may be a known rental server.

In the above-described exemplary embodiments, the relay apparatus 200 instructs the PC 400 to generate the MFP identifier corresponding to the callback URL of the MFP and transmit the MFP identifier as the value of the cookie to the relay apparatus 200. However, the above-described exemplary embodiments may be modified such that the callback URL of the MFP is set as the value of the cookie.

For example, with respect to the first exemplary embodiment shown in FIG. 3, if the relay apparatus 200 receives the callback URL of the MFP from the MFP 100 in STEP U302, the relay apparatus 200 may add the callback URL of the MFP as the parameter of the query character string to the service selection screen URL to be transmitted to the MFP 100 without storing the callback URL of the MFP (that is, without performing STEP U303). Then, the relay apparatus 200 transmits the service selection screen URL to the PC 400 through the MFP 100 in STEP U305, and the PC 400 transmits the service selection screen URL to the relay apparatus 200 in STEP U306. Upon receiving the service selection screen URL, the relay apparatus 200 may get the callback URL of the MFP from the service selection screen URL, set the callback URL of the MFP as the value of the cookie, and transmit the callback URL of the MFP, in STEP U307.

Similarly, with respect to the second exemplary embodiment shown in FIG. 7, the relay apparatus 200 may get the callback URL of the MFP from the service selection screen URL, without storing the callback URL of the MFP (that is, without performing STEP U806), and set the callback URL of the MFP as the value of the cookie in STEP U807.

According to this modification, the callback URL of the MFP is stored as the value of the cookie in the PC 400, and whenever the PC 400 transmits an HTTP message to the relay apparatus 200, the callback URL of the MFP is also transmitted. Therefore, the MFP identifier table 204c may be provided to the relay apparatus 200, or since it is not required to generate the MFP identifier, it is possible to reduce a load on the relay apparatus 200. As a result, it is possible to suppress the operational cost of the relay apparatus 200 or the equipment investment cost for the relay apparatus 200.

In the above-described exemplary embodiments, the MFP 100 that is an example of the communication device has no web browser installed therein; however, the present invention can be applied to a communication device having a web browser installed therein.

In the above-described exemplary embodiments, the example of setting the MFP identifier as the value of the cookie and transmitting the MFP identifier to the PC 400 have been described as an example of 'instructing the browser-installed device to output the communication-device location information or the correspondence information corresponding to the communication-device location information got as the communication-device location information of the communication device connected to the browser-installed device by the first getting process, to the relay apparatus.' In this case, the browser-installed device can include the MFP identifier in the HTTP message to be transmitted to the relay apparatus and transmit the HTTP message to the relay apparatus. Alternatively, for example, the communication-device location information or the correspondence information may be added as the parameter of the query character string to the callback URL 530 of the relay apparatus, and the browser-installed device may be instructed to transmit that value to the relay apparatus. Alternatively, the communication-device location information or the correspondence information may be embedded in a HTML to be transmitted from the relay apparatus to the browser-installed device, and the browser-installed device may be instructed to transmit the value of that information to the relay apparatus.

In the above-described exemplary embodiments, the callback URL of the MFP or the authentication-token correspondence information is included in the query character string added to the URL, which is transmitted. However, the above-described exemplary embodiments may be modified such that the callback URL of the MFP or the authentication-token correspondence information is included in a packet by another means, and the packet is output from the communication device.

In the above-described exemplary embodiments, as an example of the communication-device location information, the callback URL of the MFP has been exemplified; however, the communication-device location information may be an IP address. In this case, the relay apparatus 200 needs a process of adding a character string stored in advance, to the IP address got in STEP U302 or U805, so as to get the callback URL of the MFP 100.

In the third exemplary embodiment, the relay apparatus 200 stores the authentication token received from the PC 400, and the authentication-token correspondence information corresponding to the authentication token, in association with each other, and transmits the authentication token stored in association with the authentication-token correspondence information if receiving the corresponding authentication-token correspondence information from the MFP 100. Alternatively, if receiving the authentication token from the PC 400, the relay apparatus 200 may generate the authentication-token correspondence information in accordance with a rule predetermined with respect to the corresponding authentication token so as to transmit the authentication-token correspondence information to the MFP 100. Then, if receiving the authentication-token correspondence information from the MFP 100, the relay apparatus 200 may generate the authentication token in accordance with a rule and transmit the authentication token to the MFP 100.

What is claimed is:
1. A communication system comprising a communication device and
   a relay apparatus,
   wherein the communication device and the relay apparatus are connected to a network that an external service is connected to,
   wherein the communication device comprises:
      a communication unit configured to be connected to the network and to a web-browser enabled device, wherein the web-browser enabled device comprises a browser unit, and wherein the web-browser enabled device is connected to the network; and a communication device controller configured to perform:

a first transmitting process of, in response to receiving from the web-browser enabled device a first request for data location information, transmitting to the web-browser enabled device the data location information representing a location of predetermined data, wherein the web-browser enabled device is connected to the communication device via the communication unit over the network; and an outputting process of outputting communication-device location information representing a location of the communication device, and a data-location-information obtaining process of obtaining the data location information from the relay apparatus, wherein upon receiving the first request for the data location information from the web-browser enabled device, the first transmitting process transmits, to the web-browser enabled device, the data location information obtained by the data-location-information obtaining process;

wherein the relay apparatus comprises:

a relay apparatus communication unit configured to be connected to the network; and a relay apparatus controller configured to perform:

a first receiving process of receiving, from the web-browser enabled device, a second request based on the data location information;

a second transmitting process of transmitting to the web-browser enabled device the predetermined data in response to receiving the second request, the second request is received in the first receiving process based on the data location information;

a first obtaining process of obtaining the communication-device location information outputted by the communication device, the communication device is connected to the web-browser enabled device;

a first instructing process of instructing the web-browser enabled device to output, to the relay apparatus, (a) the communication-device location information of the communication device connected to the web-browser enabled device, wherein the communication-device location information obtained by the first obtaining process, (b) or correspondence information corresponding to said communication-device location information, wherein the web-browser enabled device is connected to the communication device via the communication unit over the network;

a second receiving process of receiving, from the web-browser enabled device, authentication data of the external service;

a second obtaining process of, in response to receiving the authentication data in the second receiving process, obtaining (a) the communication-device location information outputted by the web-browser enabled device or (b) the correspondence information corresponding to the communication-device location information and outputted by the web-browser enabled device; and a second instructing process of instructing the web-browser enabled device to transmit the authentication data to the communication device, the communicating device being represented by the communication-device location information obtained by the second obtaining process.

2. The communication system according to claim 1, wherein the relay apparatus further comprises a storage unit configured to store the predetermined data, and wherein when the first receiving process receives the second request based on the data location information, the second transmitting process transmits the predetermined data read from the storage unit to the web-browser enabled device.

3. The communication system according to claim 1, wherein the predetermined data includes designation information designating the external service.

4. The communication system according to claim 1, wherein when receiving the first request for data location information from the web-browser enabled device, the data-location-information obtaining process obtains the data location information from the relay apparatus, and wherein the first transmitting process transmits the data location information obtained by the data-location-information obtaining process to the web-browser enabled device that has requested the data location information.

5. The communication system according to claim 1, wherein in the communication device, the outputting process further outputs the communication-device location information by adding the communication-device location information to the data location information to be transmitted to the web-browser enabled device by the first transmitting process, and wherein in the relay apparatus, upon receiving the second request based on the data location information from the web-browser enabled device, the first obtaining process obtains the communication-device location information added to the data location information.

6. The communication system according to claim 5, wherein the relay apparatus controller further performs:

a first storage control process of storing the communication-device location information, obtained by the first obtaining process, in a storage unit; and a first correspondence-information generating process of generating the correspondence information corresponding to the communication-device location information stored by the first storage control process, and wherein the first instructing process instructs web-browser enabled device to output the correspondence information generated by the first correspondence-information generating process to the relay apparatus when the browser-installed device transmits data to the relay apparatus.

7. The communication system according to claim 1, wherein the communication device controller further performs a data-location-information requesting process of transmitting a third request for the data location information to the relay apparatus, wherein the outputting process further transmits the communication-device location information to the relay apparatus when the data-location-information requesting process transmits the third request for the data location information to the relay apparatus, and wherein in the relay apparatus, the first obtaining process further obtains the communication-device location information transmitted from the communication device when receiving the first request for the data location information from the communication device.

8. The communication system according to claim 7,
wherein the relay apparatus controller further performs:
- a second storage control process of storing the communication-device location information, obtained by the first obtaining process, in a storage unit;
- a second correspondence-information generating process of generating correspondence information corresponding to the communication-device location information stored by the second storage control process; and
- a data-location-information transmitting process of transmitting the data location information including the correspondence information generated by the second correspondence-information generating process to the communication device, wherein in the communication device, the first transmitting process further transmits to the web-browser enabled device the data location information including the correspondence information received from the relay apparatus, and wherein in the relay apparatus,
- the first receiving process receives the second request based on the data location information including the correspondence information, and
- when the first receiving process receives the data location information including the correspondence information, the first instructing process instructs the web-browser enabled device to output the correspondence information to the relay apparatus.

9. The communication system according to claim 1,
wherein the first instructing process instructs the browser unit of the web-browser enabled device to output, to the relay apparatus, the communication-device location information or the correspondence information corresponding to the communication-device location information.

10. A communication system comprising a communication device and
a relay apparatus,
wherein the communication device and the relay apparatus are connected to a network that an external service is connected to,
wherein the communication device comprises:
- a communication unit configured to be connected to the network and to a web-browser enabled device, wherein the web-browser enabled device comprises a browser unit, and wherein the web-browser enabled device is connected to the network; and
- a communication device controller configured to perform:
  - a first transmitting process of, in response to receiving, from the web-browser enabled device a first request for data location information, transmitting to the web-browser enabled device the data location information representing a location of predetermined data, wherein the web-browser enabled device is connected to the communication device via the communication unit over the network, and
  - an outputting process of outputting communication-device location information representing a location of the communication device,
  - a data-location-information obtaining process of obtaining the data location information from the relay apparatus, and
  - wherein upon receiving the first request for the data location information from the web-browser enabled device, the first transmitting process transmits, to the web-browser enabled device, the data location information obtained by the data-location-information obtaining process;

wherein the relay apparatus comprises:
- a relay apparatus communication unit configured to be connected to the network; and
- a relay device controller configured to perform:
  - a first receiving process of receiving, from the web-browser enabled device, a second request based on the data location information;
  - a second transmitting process of transmitting to the web-browser enabled device the predetermined data in response to receiving the second request, the second request is received in the first receiving process based on the data location information;
  - a first obtaining process of obtaining the communication-device location information outputted by the communication device, the communication device is connected to the web-browser enabled device;
  - a first instructing process of instructing the web-browser enabled device to output, to the relay apparatus, (a) the communication-device location information of the communication device connected to the web-browser enabled device, wherein the communication-device location information obtained by the first obtaining process, (b) or correspondence information corresponding to said communication-device location information, wherein the web-browser enabled device is connected to the communication device via the communication unit over the network;
  - a second receiving process of receiving, from the web-browser enabled device, authentication data of the external service;
  - a second obtaining process of, in response to receiving the authentication data in the second receiving process, obtaining (a) the communication-device location information outputted by the web-browser enabled device or (b) the correspondence information corresponding to the communication-device location information and outputted by the web-browser enabled device; and
  - a second instructing process of instructing the web-browser enabled device to transmit correspondence authentication data corresponding to the authentication data to the communication device, the communication device being represented by the communication-device location information obtained by the second obtaining process; and
  - a third transmitting process of transmitting the authentication data corresponding to the correspondence authentication data when the correspondence authentication data is received from the communication device.

11. The communication system according to claim 10,
wherein the relay apparatus further comprises a storage unit configured to store the predetermined data, and
wherein when the first receiving process receives the second request based on the data location information, the second transmitting process transmits the predetermined data read from the storage unit to the web-browser enabled device.

12. The communication system according to claim 10,
wherein the predetermined data includes designation information designating the external service.

13. The communication system according to claim 10,
wherein when receiving the first request for data location information from the web-browser enabled device, the data-location-information obtaining process obtains the data location information from the relay apparatus, and
wherein the first transmitting process transmits the data location information obtained by the data-location-information obtaining process to the web-browser enabled device that has requested the data location information.

14. The communication system according to claim 10,
wherein in the communication device, the outputting process further outputs the communication-device location information by adding the communication-device location information to the data location information to be transmitted to the web-browser enabled device by the first transmitting process, and
wherein in the relay apparatus, upon receiving the second request based on the data location information from the browser-installed device, the first obtaining process obtains the communication-device location information added to the data location information.

15. The communication system according to claim 14,
wherein the relay apparatus controller further performs:
    a first storage control process of storing the communication-device location information, obtained by the first obtaining process, in a storage unit; and
    a first correspondence-information generating process of generating the correspondence information corresponding to the communication-device location information stored by the first storage control process, and
wherein the first instructing process instructs the web-browser enabled device to output the correspondence information generated by the first correspondence-information generating process to the relay apparatus when the web-browser enabled device transmits data to the relay apparatus.

16. The communication system according to claim 10,
wherein the communication device controller further performs a data-location-information requesting process of transmitting a third request for the data location information to the relay apparatus,
wherein the outputting process further transmits the communication-device location information to the relay apparatus when the data-location-information requesting process transmits the third request for the data location information to the relay apparatus, and
wherein in the relay apparatus, the first obtaining process further obtains the communication-device location information transmitted from the communication device when receiving the first request for the data location information from the communication device.

17. The communication system according to claim 16,
wherein the relay apparatus controller further performs:
    a second storage control process of storing the communication-device location information, obtained by the first obtaining process, in a storage unit;
    a second correspondence-information generating process of generating correspondence information corresponding to the communication-device location information stored by the second storage control process; and
    a data-location-information transmitting process of transmitting the data location information including the correspondence information generated by the second correspondence-information generating process to the communication device,
wherein in the communication device, the first transmitting process further transmits to the web-browser enabled device the data location information including the correspondence information received from the relay apparatus, and
wherein in the relay apparatus,
    the first receiving process receives the second request based on the data location information including the correspondence information, and
    when the first receiving process receives the data location information including the correspondence information, the first instructing process instructs the web-browser enabled device to output the correspondence information to the relay apparatus.

18. The communication system according to claim 10,
wherein the first instructing process instructs the browser unit of the web-browser enabled device to output, to the relay apparatus, the communication-device location information or the correspondence information corresponding to the communication-device location information.

* * * * *